March 5, 1946.  N. T. McKEE  2,396,110
METHOD OF FORMING FLANGES ON BREECHES PIECE OR THE LIKE
Filed April 1, 1944
Fig. 1
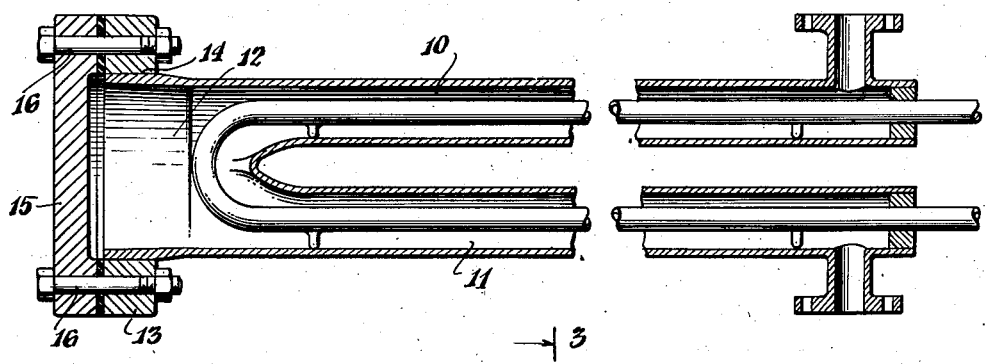
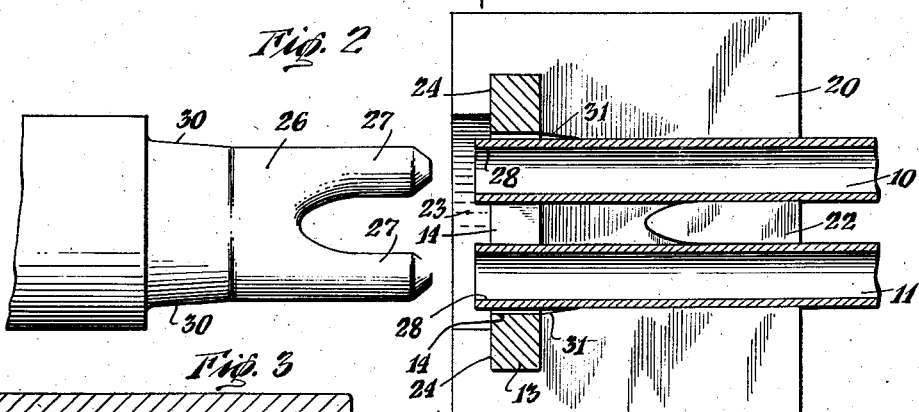
Fig. 2
Fig. 3
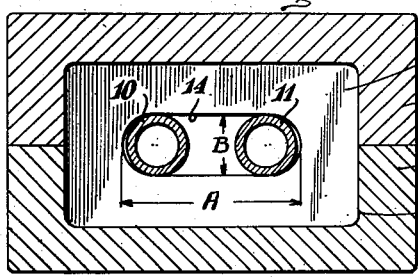
Fig. 4
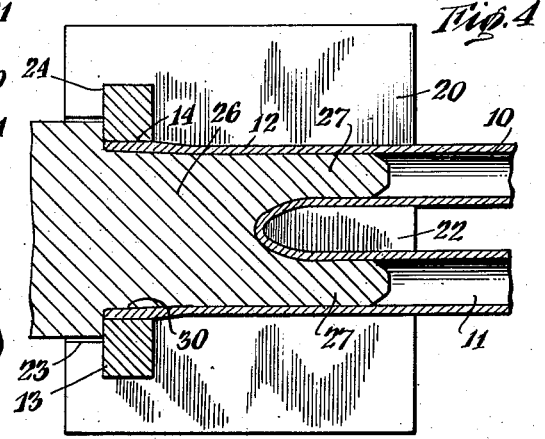
Fig. 5
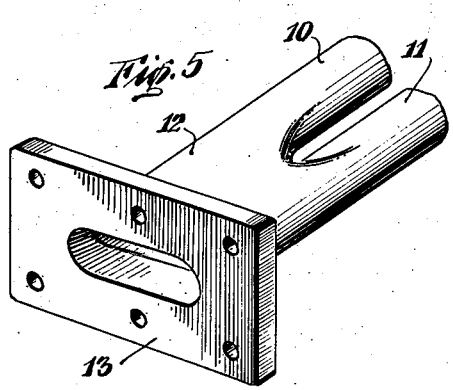
INVENTOR.
Neal T. McKee
BY
James J. Whalen
ATTORNEY Patented Mar. 5, 1946

2,396,110

UNITED STATES PATENT OFFICE 2,396,110

METHOD OF FORMING FLANGES ON BREECHES PIECE OR THE LIKE

Neal T. McKee, Bronxville, N. Y., assignor to The Superheater Company, New York, N. Y.

Application April 1, 1944, Serial No. 529,122

2 Claims. (Cl. 29—157.6)

The present invention relates to an improved method of forming a flanged closure seat on a heat exchanger casing having a pair of tubular metallic branches.

The present invention is directed to a bifurcated heat exchanger casing closed at one end by a cover fastened to a flange plate at the outer end of the junction of the bifurcations, and according to the invention this flange plate is made to form an integral part of the bifurcated casing by forge welding it to the end thereof simultaneously with the formation of the bifurcated casing from the end parts of the tubular members.

The invention will be best understood upon consideration of the following detailed description of an illustrative embodiment thereof when read in conjunction with the accompanying drawing in which:

Figure 1 is a longitudinal sectional view of a bifurcated heat exchanger casing closed at its open end by a cover plate attached to a flange formed on the casing in accordance with the present invention.

Figure 2 is a plan view of the welding plunger and the lower half of the die with the tubular members and die plate illustrated in cross-section and shown as they appear before the welding operation.

Figure 3 is a view on the line 3—3 in Figure 2 but also shows the upper half of the die in place.

Figure 4 shows the position of the welding plunger and the workpiece in the lower half of the die at the completion of the welding operation; and Figure 5 is a perspective view of the completed bifurcated housing and its integrally joined flange plate.

In Figure 1 the numerals 10 and 11 designate a pair of parallelly disposed tubular members integrally joined at one end by a breeches piece 12 provided at its outer end with an integrally formed flange plate 13 to which a removable cover plate 14 is secured by bolts 15. As illustrated in Figure 1 the tubular members 10 and 11 constitute parallel branches of a heat exchanger casing.

In accordance with the present invention the breeches piece is forge welded in the same manner as followed in forming breeches pieces for such heat exchange tubes as described for example in the patent to True, 1,169,209 of January 25, 1916, and the flange plate 13 is integrally joined to the latter at the same time. Both the lower and upper halves 20, 21 of the usual die have the customary two semi-cylindrical grooves separated by a wall 22 and merge into a wider semi-oval recess 23 extending to the outer edge of the die and forming a cavity in which the breeches piece is formed. In addition, both die halves are formed with recesses 24 opening laterally from the base of the widened part 23 to receive and hold the flange plate 13 during the welding operation.

Before the welding operation the flange plate 13 is formed with an aperture 14 of a size to fit it closely on the ends of the tubular members 10 and 11 when the latter are mounted or clamped in the spaced relations that they are to occupy in the finished heat exchanger casing. The major axis A (Fig. 3) of this aperture is of a length corresponding substantially to the spacing of the outermost points of the peripheries of the tubes 10 and 11, i. e. to the aggregate of their diameters plus the distance spacing them, and its minor axis B corresponds substantially to the diameter of either of the tubular members 10, 11.

The ends of the tubular members 10, 11 and the flange plate 13 thereon are heated to welding temperature and then inserted in the lower half 20 of the die so that the extreme ends of the tubes project slightly beyond the outer face of the flange plate 13 for a purpose which will appear presently. The upper half of the die 21 is then mounted and during the stroke of the plunger 26 the fingers 27 thereof slit the facing walls of the tubes 10, 11 for a distance from their ends, bend the portions adjacent to the slits thereof outwardly thereby bringing their edges into contact and cause them to become welded to each other so as to form an integral breeches piece on the end of the tubes 10, 11. Simultaneously with the formation of the breeches piece part of the metal of the end portions of the tubes 10, 11, including the projecting parts 28, is caused to flow and squeezed outwardly by the tapered part 30 on the plunger so that the metal of the tubular members melds with that of the flange plate 13 around the entire margin of the aperture 14 therein in such manner as to integrally join the flange piece 13 to the end of the breeches piece as appears in Fig. 4. Some of the displaced metal enters into the recessed portion 31 of the die adjacent the inner side of the recess 24 forming a fillet weld between the breeches piece and the rear face of flange 13.

Bolt holes are subsequently formed in the flange plate 13 so that a closure plate 15 may be applied to close the end of the breeches piece and thus complete the device as a bifurcated casing for a heat exchanger.

What I claim is:

1. The method of forming a bifurcated casing having parallel branches with a removable closure opposite the junction of the branches which comprises; mounting a pair of tubular metallic casing members with their longitudinal axes parallel and in the spaced relation desired for the two branches of the casing; forming in a metallic plate an elongated aperture having a major axis of a length substantially equal to the overall dimension between the outer surfaces of said tubular members in their spaced relation and with a minor axis of a length corresponding substantially to the width or diameter of said tubular members; mounting said plate on said tubular members as a flange by fitting its aperture thereover and positioning said plate immediately adjacent the end of the two members; heating said members and plates to the welding temperature, and forge welding said tubular members to form an integral breeches piece at the ends thereof while simultaneously forge welding the outer wall adjacent said breeches piece to the portion of said plate that constitutes the wall of said aperture.

2. The method of forming a bifurcated casing having parallel branches with a removable closure opposite the junction of the branches which comprises; mounting a pair of tubular metallic casing members with their longitudinal axes parallel and in the spaced relation desired for the two branches of the casing; forming in a metallic plate an elongated aperture having a major axis of a length substantially equal to the overall dimension between the outer surfaces of said tubular members in their spaced relation and with a minor axis of a length corresponding substantially to the width or diameter of said tubular members; mounting said plate on said tubular members as a flange by fitting its aperture thereover and positioning said plate immediately adjacent the end of the two members; heating said members and plates to the welding temperature, forge welding said tubular members to form an integral breeches piece at the ends thereof while simultaneously forge welding the outer wall adjacent said breeches piece to the portion of said plate that constitutes the wall of said aperture, and forming spaced apertures through said plate to receive fastening members for securing a closure plate thereto.

NEAL T. McKEE.